United States Patent
Duclo et al.

[11] 3,776,354
[45] Dec. 4, 1973

[54] SNOWMOBILE ENGINE AND TORQUE CONVERTER MOUNT

[75] Inventors: Marley J. Duclo; Michael E. Baker, both of Brooten, Minn.

[73] Assignee: Brutanza Engineering, Inc., Brooten, Minn.

[22] Filed: Mar. 2, 1972

[21] Appl. No.: 230,736

[52] U.S. Cl.................. 180/64 R, 180/72, 180/5 R, 248/8
[51] Int. Cl............................................. B60k 5/04
[58] Field of Search.................. 180/5 R, 63, 64 R, 180/72; 248/8, 9, 10, 15; 308/22, 26

[56] References Cited
UNITED STATES PATENTS
764,737   7/1904   Lea....................................... 180/63
2,105,153   1/1938   Ledwinka...................... 180/64 R X OTHER PUBLICATIONS
Advertising Brochure "Introducing The All New Speedway" Speedway – Mansfield, Ohio

*Primary Examiner*—Richard J. Johnson
*Attorney*—Ralph L. Dugger et al.

[57] ABSTRACT

A mounting structure for the engine and torque converter of a snowmobile, which makes the engine and torque converter a separate unit. The engine-torque converter unit is then mounted to the frame of the machine through vibration isolation bushings. The unit mounting eliminates misalignment of the torque converter drive belt. The mounting also reduces fatigue failure of snowmobile chassis because both the drive and driven pulleys are connected to the engine, and the chassis does not have to carry the high belt load as is required when the pulley forming the torque converter is separately mounted from the engine.

9 Claims, 4 Drawing Figures

3,776,354

SNOWMOBILE ENGINE AND TORQUE CONVERTER MOUNT

BACKGROUND OF THE INVENTION

1. Field of the Invention

The present invention relates to engine and torque converter mounting arrangements for use in snowmobiles.

2. Prior Art

In almost all snowmobiles, the production models have the engine mounted to the snowmobile chassis by utilizing a mounting plate or plates that can be either rigid or made of spring-like material fastened to the bottom of the engine crankcase. The mount is then fastened to the chassis with rubber bushings, which are designed to isolate the engine vibrations from the chassis. A conventional belt type, variable pulley torque converter is driven through a centrifugal clutch directly from the engine. The clutched drive pulley is on the crankshaft and the driven torque converter pulley is mounted on a jackshaft. The jackshaft transfers power from the torque converter pulley to a chain drive reduction case and the track for the snowmobile is driven from the output shaft of the chain reduction case.

In prior art devices one of the problems is that the engines have been advanced so they produce very high horsepower in relation to their weights. These high performance engines give a rather high vibration level, and very careful control of the engine mounting has to be made in order to isolate the vibrations from the chassis or frame. These mountings have to be soft rubber to absorb the high frequency vibrations. Then, as power is transmitted through the drive belt from the engine to the driven variable pulley forming the torque converter, which is mounted on a shaft independently and rigidly mounted on the chassis, the drive belt tension will cause the soft rubber vibration isolation mountings to compress. The compression causes the engine to shift and this will cause misalignment between the driven pulley forming the torque converter, and drive pulley on the crankshaft of the engine thereby shortening drive belt life as well as placing additional load on the mounting for the torque converter. Compression of the rubber mounting bushings for the engine also increases the transmission of engine vibration to the snowmobile chassis. This will therefore also cause fatigue failure of the chassis and related components of the snowmobile such as gages, lights and other breakable items. Excessive vibration also is objectionable because of increased operator discomfort.

Many manufacturers have attempted to solve the vibration problem by making elaborate subassemblies of heavy aluminum plates and castings to which the engine and chain reduction case are rigidly attached. The subassembly is then mounted onto the chassis with rubber bushing mountings. This solves the belt alignment and vibration isolation problems, but the system is difficult to manufacture and is plagued in and of itself with fatigue problems caused by the direct mounting of the vibrating engine to a rather extensive, heavy subassembly.

Other companys have utilized a push rod between the engine and chassis to counteract the belt pull reaction. This also is somewhat less than desirable because vibration travels through the push rod to the chassis or frame, and the push rod and its connections are subject to vibration failure.

SUMMARY OF THE INVENTION

The present invention relates to a lightweight mounting for a snowmobile engine and belt drive torque converter. The mounting comprises utilizing spaced engine mounting lugs that attach to the engine and to the snowmobile frame. One of the mounting lugs also mounts a jackshaft onto which the variable pulley torque converter is mounted. This gives a relatively rigid mounting for the jackshaft and pulley of the torque converter with respect to the drive pulley so that the changing belt tension on the torque converter does not cause misalignment. The entire engine and torque converter unit also then may be vibration isolated through suitable rubber bushings to the chassis of the snowmobile. The opposite end of the jackshaft from the driven pulley is mounted directly to a chain case that in turn is mounted on the chassis.

A bearing is utilized for mounting the jackshaft to the engine mounting lug and this bearing can be rubber mounted if desired to permit slight compression, but the rubber mounting is relatively firm to prevent misalignment of the drive and driven pulleys when belt tensions get high.

The mounting system is relatively low cost, gives a stable mount for the torque converter, is lightweight, in that the lugs weigh very little more than the conventional engine mounting lugs, and yet they insure that the torque converter drive belt will run true at all times.

The system of mounting has the additional feature of permitting the inclination of the engine from a vertical position to give a lower silhouette to the snowmobile. This also permits the placing of the carburetors at the top of the engine where cold incoming air is taken directly into the carburetors. The exhaust system is positioned on the opposite side of the engine and extends downwardly. The hot air from the exhaust will not be used for intake air at the carburetors. In the normal engine arrangement, the carburetor is usually at the rear of the engine where the intakes receive hot air because the air passes over the exhaust system before it is taken into the carburation system. Heating the intake air reduces the maximum power developed by the engine.

Because the engine and the output shaft for the belt drive torque converter are mounted in a relatively rigid, widely spaced assembly, softer engine mounting vibration isolation bushings can be used so that vibration is minimized without causing any misalignment problems when the engine shifts in the soft mounts. The drive pulley and the driven torque converter pulley, as well as the belt itself move as a unit with the engine It is therefore an object of the present invention to present an engine and belt drive torque converter mounting that is low cost, and prevents misalignment between the components of the belt drive.

It is still a further object of the present invention to give a low cost engine-torque converter mounting that reduces vibrations transmitted to the chassis of a snowmobile on which the engine and torque converter are mounted.

It is a further object of the present invention to present an engine having a mounting system where the engine mounts are widely spaced for stability, and are utilized for mounting driven components such as torque converters.

Other objects of the invention will be apparent as the description proceeds.

DESCRIPTION OF THE PREFERRED EMBODIMENT

Figure 1:
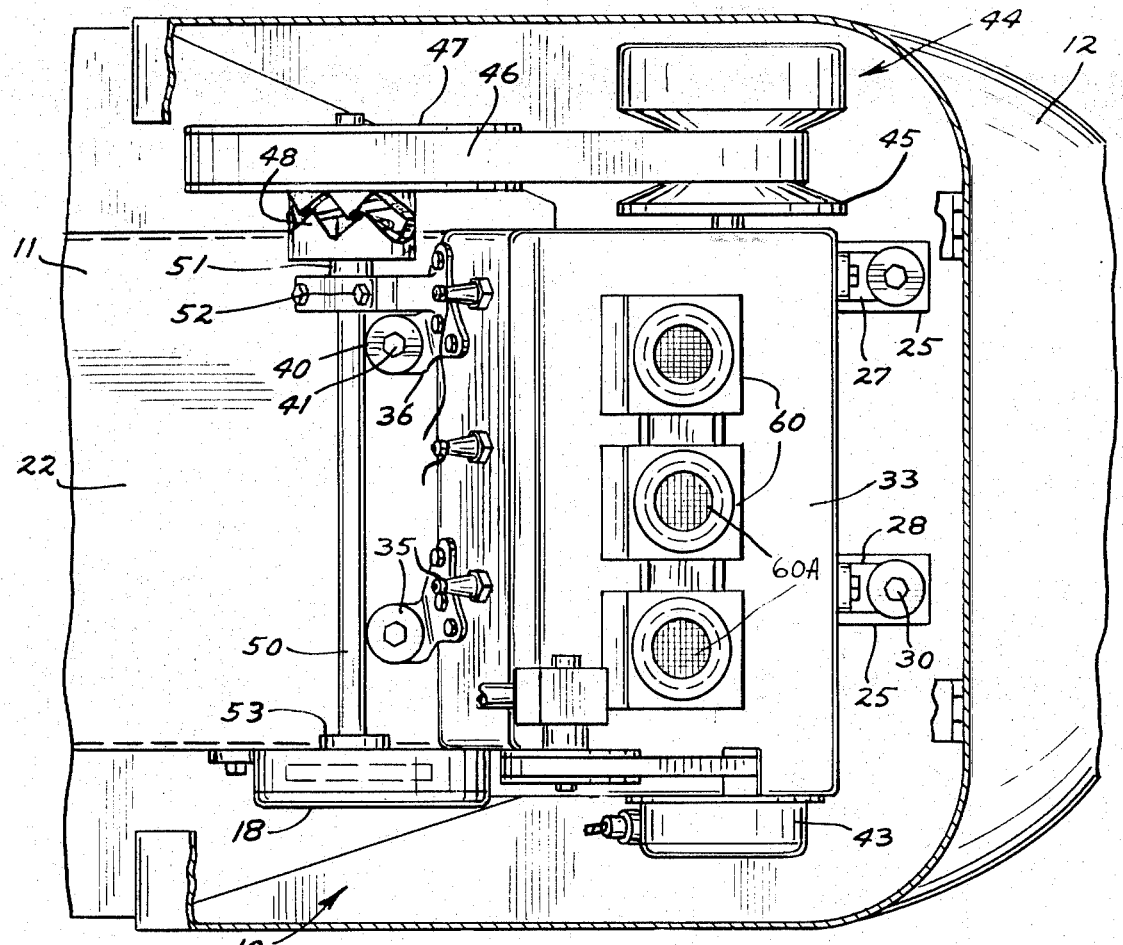
FIG. 1 is a top plan view of a front portion of a snowmobile showing an engine mounted therein according to the present invention with details of the engine omitted for clarity.
Figure 3:
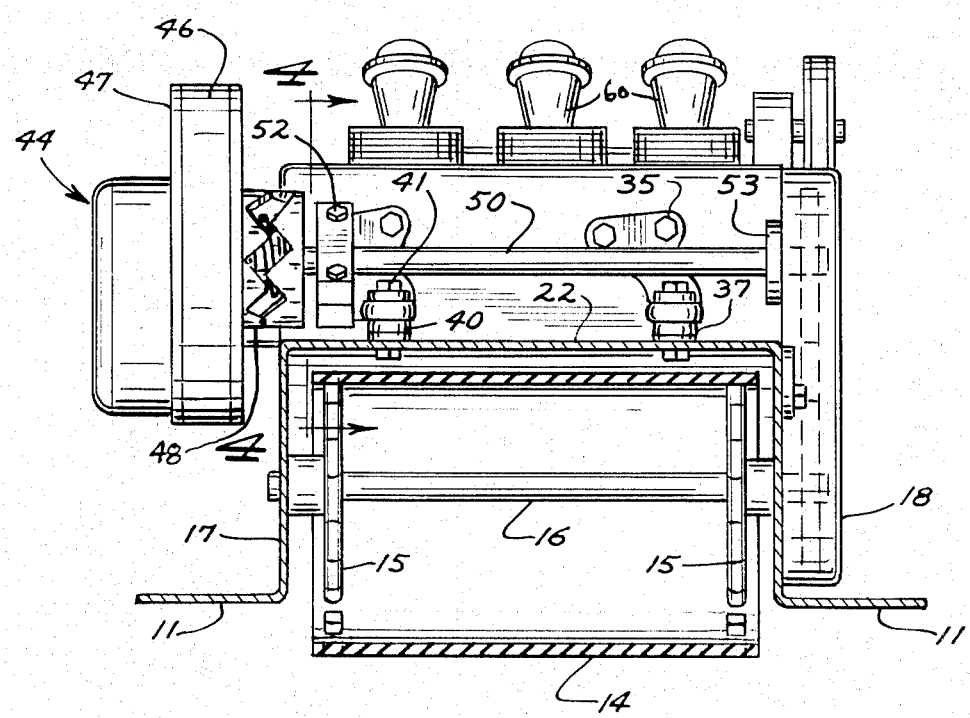
FIG. 3 is a sectional view taken as on line 3—3 in FIG. 2.
Figure 4:
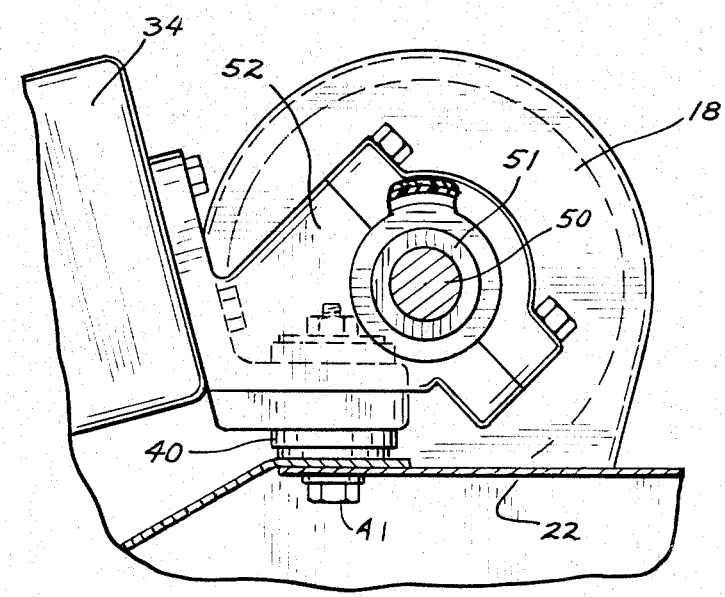
FIG. 4 is a sectional view taken as on line 4—4 in FIG. 3.

In FIG. 1, the front portions of a snowmobile are indicated generally at 10 and the snowmobile has a main chassis 11 that extends longitudinally along the snowmobile. A forward housing 12 encloses the engine and forward drive components. The housing 12 is attached in a suitable manner to the chassis 11. The snowmobile includes an operators seat and a gas tank 13 behind the engine compartment. A snowmobile drive track 14 is mounted for driving the snowmobile in the usual manner. This drive track 14 is moved over suitable sprockets 15 at the forward end thereof that are mounted onto a cross shaft 16 (see FIG. 3), and supported in suitable bearings 17. The outer ends of the shaft 16 passes through provided walls of the chassis and is driven from the output of a chain case 18 that houses a suitable chain and sprocket drive assembly, of usual design.

Of course, the chassis configuration can be modified to suit particular snowmobiles, and also the track configuration can be made in accordance with the wishes of the designer.

The snowmobile chassis has spaced forwardly extending portions 21 which house separate suitable sleeves 22 for mounting spindles 23 which in turn carry steering ski assemblies 24, the upper part of which is shown for illustrative purposes. The snowmobile will be steered in the usual manner of snowmobiles, and these details are omitted from this specification for purposes of clarity. The forward chassis portions 21, as shown, are joined together with a front frame cross member which mounts a pair of supports 25 which are used for supporting spaced apart motor mounting lugs 27 and 28. These motor mounting lugs, as shown, are mounted to the supports 25 through rubber bushings 29 in the usual manner, and the bushings are attached to the members 25 with suitable bolts 30 that pass through sleeves molded into the rubber bushings. The rubber mounting bushings 29 pass through openings in the motor mounts. The rubber mounting bushings are conventional and usually have a center sleeve through which the bolt extends. The outer surfaces of the bushings pass through the openings in the lugs, and when the mounting bolt is tightened a washer compresses the rubber bushing axially so the diameter of the bushing expands, to hold the mounting lug. The sleeve inside the rubber provides a secure fastening to the chassis. The motor mount lugs 27 and 28 are thereby not directly fixed to the chassis, but are attached through the rubber bushings only.

The motor mounts 27 and 28 have integral upright extending legs that are rigidly connected directly to the bottom of the crankcase of a snowmobile engine 33. As shown, the engine 33 is positioned generally on its side with the head 34 extending rearwardly and upwardly along the forward portion 21 of the chassis. The engine 33 is attached to the upper wall 22 of the chassis with a first angled upper engine mounting lug 35, and a second angled upper engine mounting lug 36. The engine mounting lug 35 is bolted rigidly to the head 34 of the engine, and is also attached through a rubber bushing 37 to the chassis wall 22 and the rubber bushing is connected to the chassis with a suitable bolt 38.

The second upper engine mounting lug 36 is also rigidly connected to the engine head 34 with suitable bolt, and this lug also is attached to the upper wall 22 of the chassis through a rubber bushing 40 and suitable bolt 41.

The engine 33 can be of any usual or preferred design, but as shown, is a two cycle, three cylinder, water cooled engine. The engine is positioned with its crankshaft extending transversely across the snowmobile, and at one end of the shaft a starting unit 43 is mounted, and includes the usual rope pull starter or the like, and at the other end of the crankshaft a conventional centrifugal clutch variable pulley assembly 44 is mounted onto the crankshaft. The clutch assembly 44 includes a variable drive pulley 45, on which a drive belt 46 is drivably mounted. The pulley 45 is the drive component to the torque converter used with the snowmobile. The drive belt 46 is mounted onto the driven variable size pulley 47 forming the torque converter of usual design. The pulley 47 in turn is mounted onto the outer end of a jackshaft 50. The jack-shaft 50 is mounted with a bearing 51 in a bearing housing 52 that is formed integral with the second upper engine mounting lug 36. The bearing housing 52 has a removable bearing cap for assembly purposes. The bearing 51 can be mounted in a firm rubber cushion mounting so that there is a slight amount of give in the bearing mounting. This rubber mounting is relatively rigid, in order to maintain the proper relationship between the axis of the jackshaft, and the axis of the crankshaft of the engine 33. The jackshaft 50 extends laterally across the snowmobile, and is spaced above the wall 22 of the chassis. The opposite end of shaft 50 is mounted in a suitable bearing 53 at one wall of the chain case 18. The end of the jackshaft 50 extending into the chain case 18 has a sprocket mounted thereon, and the chain drive from the sprocket on the jackshaft 50 extends down to a sprocket on the cross shaft 16 for driving the track 14 of the snowmobile. The jackshaft 50 can extend all the way through the chain case 18 if desired and a suitable brake can be placed on the outer end of the jackshaft if desired. The variable pulley 47 has a spring loaded hub 48 that permits the pulley 47 to reduce in diameter when high torque is being transmitted.

Because the engine head block and crankshaft are rigid, it can be seen that there is a rigid connection between the end of the jackshaft carrying the hub 48 and the engine crankshaft, which mounts the clutch 44 and the drive pulley 45. There are no resilient connections, other than a rubber mounting for the bearing 51, (which can be used if desired) which will permit misalignment.

As stated previously, a number of problems have arisen when the drive belt tension gets quite high, and there is shock loading present, in conventional situations where the engine is separately mounted on rubber mounting bushings from the jackshaft. The engine will "give" or move by compressing its mounting bushings and this will cause misalignment between the drive pulley and the driven pulley of the torque converter. However, as can be seen in this specification the centers of the jackshaft 50 and the crankshaft of the engine are substantially fixed because the bearing 51 in the mounting portion 52 of the engine mounting lug 36 is rigidly connected to the engine itself, through the engine head. The engine is rigid, and this keeps the center distance of the shafts at a fixed position. The unit is still light (weighting only little more than the engine) and this permits the isolation of the engine vibration from the chassis through the use of the rubber mounting bushings shown.

When the engine vibrates in its mounting bushings, the end of the jackshaft 50 adjacent the torque converter may move slightly, but the length of the jackshaft across the width of the snowmobile insures that there will not be any harmful misalignment at the bearing 53, or at the sprocket driving the chain inside the chain case 18. The bearings for the jackshaft are ball bearings that will take this small misalignment.

The rubber mounting bushings 29, 37 and 40, can be of any desired softness because in the present invention they do not have to be high durometer in order to withstand the belt tension load which normally is present from the drive belt between the crankshaft and the jackshaft. Also, because the belt tension load is not carried by the mountings for the jackshaft to the chassis, failur of the chassis from fatigue is eliminated in this area.

When the engine is laid on its side, a very low silhouette of the snowmobile front portions, is permitted, and the carburetors, indicated at 60 which are mounted on one side of the engine are in position to directly receive fresh cold air through the hood 61 of the snowmobile. The intakes 60A of the carburetor receive cold air. The exhaust pipe and muffler system indicated schematically at 62 is positioned at the opposite side of the engine, and is situated between the front portions 21 of the chassis. The muffler can then discharge exhaust gases below the chassis, and forwardly of the drive track.

The cold fresh air will pass directly into the intake of the carburetors without being preheated by the exhaust system, which normally is ahead of the engine.

Figure 2:
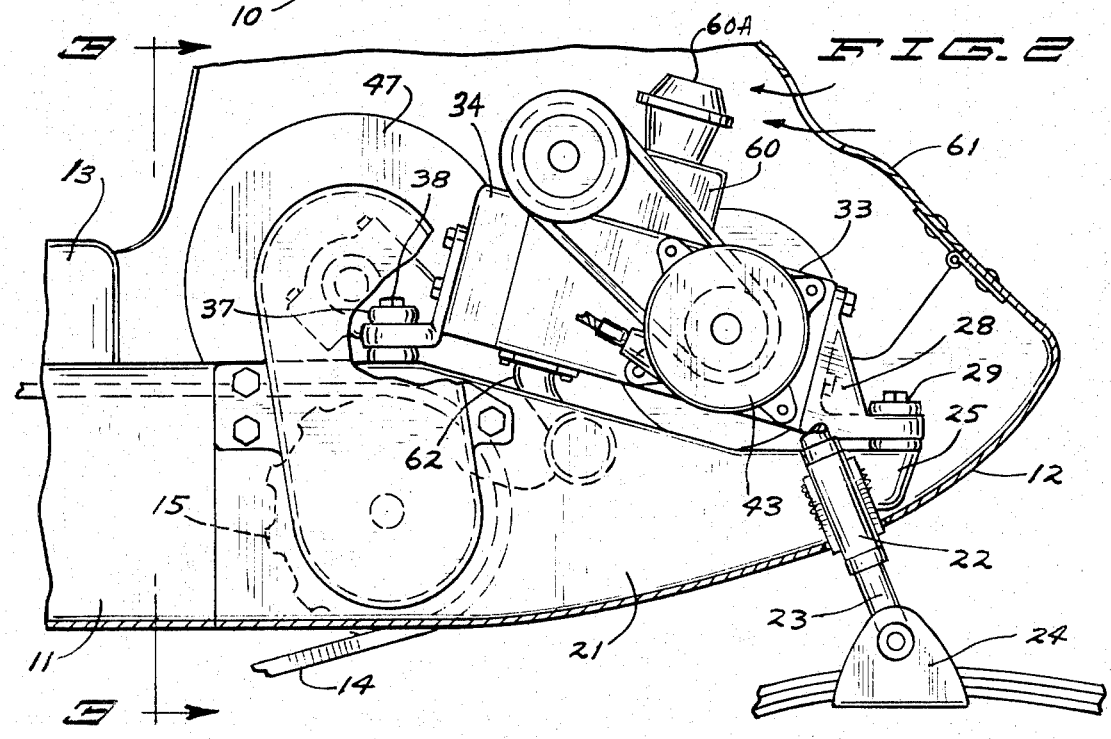
FIG. 2 is a side elevational view of the device of FIG. 1 with parts of section and parts broken away.

It also should be noted that the spacing between the crankshaft of the engine, having the drive pulley 45 thereon and the jackshaft having the driven pulley 47 thereon has to be correct for the belt 46. This means that other arrangements of the mounting system could be utilized if the center distances are maintained properly for the torque converter drive belt. If the engine is positioned more uprightly than that shown in FIG. 2, the mounting lug which holds the bearing that supports the jackshaft for the driven pulley 47 must be spaced sufficiently to maintain this center distance but can still be attached to the engine. The engine itself then forms the rigid connection between the drive and driven pulleys, and the load from belt tension is absorbed through the motor mounting lug 36 and the engine itself. The vibration isolation bushings are used for isolating the engine and torque converter assembly vibration from the chassis.

The present device eliminates the large cumbersome heavy castings that are used for mounting both engines and torque converter as a unit, because the engine itself provides the support structure between the drive and driven components.

The durometer range of the rubber bushings for the motor mounts can be reduced (made softer) to make the vibration isolation better, because the motor mounts no longer have to be able to withstand the high loads that occur when high belt tension in the drive belts are encountered. The chassis of snowmobiles are made as light as possible, and therefore prevention of loads from the drive belt to be applied to the chassis permits leaving the chassis light without having failure.

The mounting system shown has been shown in connection with snowmobiles, but it can be used with any vehicle where the same problems exist.

What is claimed is:

1. A system for mounting an engine and driven output shaft to a vehicle chassis comprising a rigid engine assembly having a crankshaft, mounting lug means for supporting said engine relative to the chassis, said mounting lug means being positioned in spaced apart locations, a bearing support means, means to mount said bearing support means on said engine for movement therewith, said output shaft having a first end portion rotatably mounted in said bearing support means, drive means mounted onto said engine and output shaft to drive the output shaft from the crankshaft of said engine, vibration isolation means mounting said mounting lug means with respect to said chassis, said output shaft having a second end portion spaced from said bearing support means, and means mounted with respect to said chassis to support said second end portion independently of the vibration isolation means.

2. The combination as specified in claim 1 wherein said bearing support means comprises means to absorb a small amount of compression when the output shaft is under load.

3. A system for mounting an engine and belt driven output shaft to a snowmobile chassis comprising a rigid engine assembly having a crankshaft, a crankcase portion and a head portion, said head portion being inclined rearwardly and upwardly from the crankcase portion, mounting lug means for supporting said engine relative to the chassis including separate mounting lug means on said head portion and said crankcase portion, at least one of said mounting lug means being connected to said head portion and including a bearing support means, said output shaft being rotatably mounted in said bearing support means, drive pulley means mounted onto the crankshaft of said engine, driven pulley means mounted on said output shaft, a drive belt drivably connecting said drive and driven pulley means, and vibration isolation means mounting said mounting lug means with respect to said chassis.

4. The combination as specified in claim 3 wherein said drive pulley means comprises a centrifugal clutch and variable size pulley, and said driven pulley means comprises a spring loaded variable size pulley forming a torque converter.

5. The combination as specified in claim 3 wherein said output shaft extends transversely to the snowmobile substantially parallel to the axis of rotation of the engine crankshaft and has a second end, output drive means attached to said chassis independently of said engine for providing power to propell said snowmobile, said output shaft being mounted on said output drive means independently of said engine adjacent said second end.

6. The combination as specified in claim 5 wherein said output drive means comprises a chain case assembly rigidly mounted to said chassis.

7. The combination as specified in claim 3 wherein said engine has carburetor means thereon, said carburetor means being on a side of said engine facing generally upwardly, and exhaust means for said engine positioned on an opposite side of said engine extending generally below the engine.

8. In a snowmobile having a chassis, an engine having a rotatable crankshaft for powering said snowmobile, a drive pulley drivably mounted on the crankshaft of said engine, and a torque responsive variable diameter driven pulley, a jack-shaft having a first end and an opposite end, means mounting said driven pulley to said jackshaft, a belt drivably connecting said drive and driven pulleys, a mounting lug having a bearing thereon rotatably mounting said jackshaft, said mounting lug being rigidly attached to said engine at a position spaced from the axis of rotation of said crankshaft, an opposite end of said jackshaft extending a substantial distance from said mounting lug, said opposite end of said jack-shaft being rotatably mounted in a separate support rigidly attached to the snowmobile chassis, and vibration isolation means mounting said engine to the snowmobile chassis independently of the opposite end of said jackshaft.

9. The combination as specified in claim 8 wherein said mounting lug rigidly attached to said engine includes a support portion for attaching said lug to said chassis, and said vibration isolation means comprises rubber bushing means connecting said support portion to said chassis.

* * * * *